United States Patent
Berri et al.

(10) Patent No.: US 12,508,608 B2
(45) Date of Patent: Dec. 30, 2025

(54) METHOD OF DEPOSITING A SUBSTANCE ON A SUBSTRATE

(71) Applicants: DBV TECHNOLOGIES, Montrouge (FR); UCL BUSINESS LTD, London (GB)

(72) Inventors: Nael Berri, Paris (FR); Sarah Darwiche, Paris (FR); Maxime Huet, Grenoble (FR); Suwan Jayasinghe, London (GB); Adam Wojcik, London (GB)

(73) Assignees: DBV TECHNOLOGIES, Montrouge (FR); UCL BUSINESS LTD, London (GB)

( * ) Notice: Subject to any disclaimer, the term of this patent is extended or adjusted under 35 U.S.C. 154(b) by 1003 days.

(21) Appl. No.: 17/622,215

(22) PCT Filed: Jun. 26, 2020

(86) PCT No.: PCT/EP2020/068124
§ 371 (c)(1),
(2) Date: Dec. 22, 2021

(87) PCT Pub. No.: WO2021/001281
PCT Pub. Date: Jan. 7, 2021

(65) Prior Publication Data
US 2022/0410188 A1    Dec. 29, 2022

(30) Foreign Application Priority Data
Jul. 1, 2019   (EP) ..................................... 19315050

(51) Int. Cl.
*B05B 5/025*   (2006.01)
*A61K 8/64*   (2006.01)
*A61K 9/70*   (2006.01)

(52) U.S. Cl.
CPC .............. *B05B 5/0255* (2013.01); *A61K 8/64* (2013.01); *A61K 9/70* (2013.01); *A61K 9/7023* (2013.01)

(58) Field of Classification Search
CPC .......... B05B 5/0255; A61K 8/64; A61K 9/70; A61K 9/7023
See application file for complete search history.

(56) References Cited

U.S. PATENT DOCUMENTS

| 4,962,885 A | 10/1990 | Coffee |
| 6,086,740 A | 7/2000 | Kennedy |

(Continued)

FOREIGN PATENT DOCUMENTS

| CH | 563807 A5 | 7/1975 |
| EP | 1479446 A1 | 11/2004 |

(Continued)

OTHER PUBLICATIONS

Notification of First Office Action mailed Aug. 2, 2023 in Chinese Patent Application No. 202080048642.2 with English translation, 20 pages.

(Continued)

*Primary Examiner* — Nathan T Leong
(74) *Attorney, Agent, or Firm* — Kim & Stewart LLP

(57) ABSTRACT

The invention relates to a method of depositing a substance onto a substrate (6), comprising: —providing a substrate (6) at a distance from a conducting spraying nozzle (1), said spaying nozzle (1) having an outlet (2); —providing a liquid composition containing the substance to the spraying nozzle (1); —generating electrically charged liquid droplets from the liquid composition between the outlet (2) of the spraying nozzle (1) and the substrate (6), by providing compressed gas around the liquid composition flowing out of the outlet (2) of the spraying nozzle (1) and by providing an electric (Continued)

Figure 1:
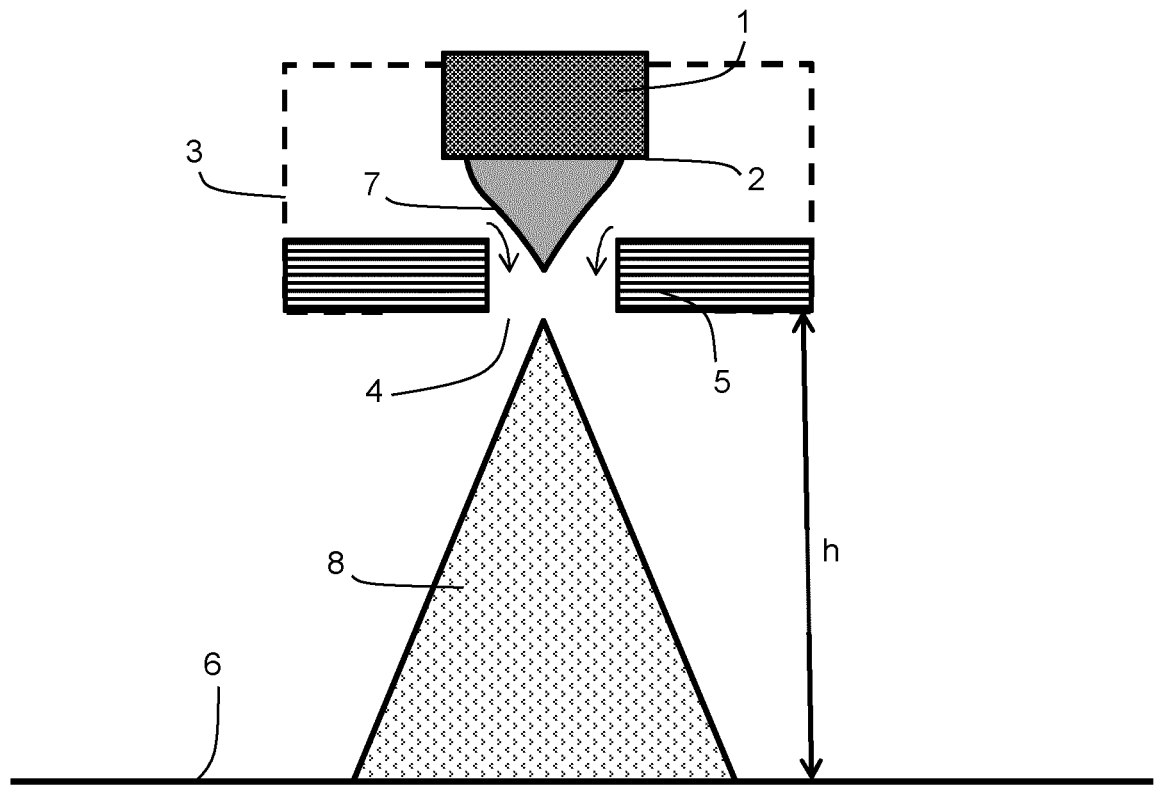

field downstream of the outlet (2) of the spraying nozzle (1); and—collecting the generated liquid droplets on the substrate (6). The invention also relates to an installation for carrying out this method.

13 Claims, 1 Drawing Sheet

(56) References Cited

U.S. PATENT DOCUMENTS

| | | | |
|---|---|---|---|
| 6,481,648 | B1 | 11/2002 | Zimmermann |
| 6,679,441 | B1 | 1/2004 | Borra et al. |
| 8,528,589 | B2 | 9/2013 | Miller et al. |
| 8,535,889 | B2 | 9/2013 | Larson et al. |
| 8,592,221 | B2 | 11/2013 | Fraden et al. |
| 8,871,444 | B2 | 10/2014 | Griffiths et al. |
| 2003/0143315 | A1* | 7/2003 | Pui ............... B05B 5/08 427/2.24 |
| 2004/0069632 | A1 | 4/2004 | Ripoll et al. |
| 2005/0116070 | A1 | 6/2005 | Ganan Calvo et al. |
| 2006/0110544 | A1 | 5/2006 | Kim et al. |
| 2010/0155496 | A1 | 6/2010 | Stark et al. |
| 2010/0297213 | A1* | 11/2010 | Dupont ............ B05B 5/14 424/447 |
| 2011/0174304 | A1 | 7/2011 | Triplett, II et al. |
| 2012/0112070 | A1 | 5/2012 | Ferraro et al. |
| 2013/0277461 | A1 | 10/2013 | Ripoll et al. |
| 2014/0084154 | A1 | 3/2014 | Bazhenov et al. |

FOREIGN PATENT DOCUMENTS

| | | |
|---|---|---|
| FR | 2776538 A1 | 10/1999 |
| JP | 2006-21148 A | 1/2006 |
| WO | 98/58745 A1 | 12/1998 |
| WO | 99/31019 A1 | 6/1999 |
| WO | 2008/142393 A1 | 11/2008 |
| WO | 2009/095591 A1 | 8/2009 |
| WO | 2011/026966 A2 | 3/2011 |
| WO | 2016/140570 A1 | 9/2016 |
| WO | 2016/142669 A1 | 9/2016 |
| WO | 2016/193721 A1 | 12/2016 |
| WO | 2017/153727 A1 | 9/2017 |

OTHER PUBLICATIONS

Arumuganathar, S. et al. "Aerodynamically assisted jet processing of viscous single- and multi-phase media," Soft Matter, 2007, 3, pp. 605-612.

Berri, Nael "Deposition of pharmaceuticals by electro-aerodynamically assisted spraying (EAAS)," PhD Thesis, 2017, 172 pages.

Ganan-Calvo, Alfonso M. "Electro-Flow Focusing: The High-Conductivity Low-Viscosity Limit," Physical Review Letters 98(13), 2007, 134503 (4 pages).

Ganan-Calvo, Alfonso M. "Enhanced liquid atomization: From flow-focusing to flow-blurring," Applied Physics Letters 86(21), 2005, 214101 (3 pages).

Ganan-Calvo, Alfonso M. et al. "Perfectly Monodisperse Microbubbling by Capillary Flow Focusing," Physical Review Letters 87(27), Dec. 31, 2001, 274501 (4 pages).

Ganan-Calvo, Alfonso M. "Generation of Steady Liquid Microthreads and Micron-Sized Monodisperse Sprays in Gas Streams," Physical Review Letters 80(2), Jan. 12, 1998, pp. 285-288.

Ganan-Calvo, Alfonso M. et al. "Revision of capillary cone-jet physics: Electrospray and flow focusing," Physical Review E 79(6), 2009, 066305 (18 pages).

Ganan-Calvo, Alfonso M. et al. "The combination of electrospray and flow focusing," J. Fluid Mech., vol. 566, pp. 421-445.

Extended European Search Report mailed Jan. 27, 2020 in European Patent Application No. 19315050.5, 9 pages.

International Search Report and Written Opinion mailed Oct. 9, 2020 in International Application No. PCT/EP2020/068124, 15 pages.

* cited by examiner

METHOD OF DEPOSITING A SUBSTANCE ON A SUBSTRATE

TECHNICAL FIELD

The present invention relates to a method of depositing a substance on a substrate, particularly to a method of depositing a biological substance such as a protein, on a substrate such as a patch.

TECHNICAL BACKGROUND

Cutaneous application of a substance by means of a patch has many applications in human or animal health. Indeed, it may allow development of efficient diagnostic tests or therapeutic methods wherein active ingredients are transferring to the skin.

Topically applying substances on the skin has many advantages as compared with other methods of administration such as injection, and notably the absence of any risk of contamination, the absence of pain, handling ease, or the possibility for the patient to self-administer the substance.

Document WO 2009/095591 discloses a method for making a patch intended for skin application of a substance, wherein the patch includes a conductive support, the method comprising depositing a liquid formulation of the substance on the support of the patch by electrohydrodynamic spraying (also known as the "electrospray" technology).

Although this method provides satisfactory results in a number of situations, the flow rate which can be achieved with this method remains limited, especially when the liquid formulation has a relatively high conductivity.

Unfortunately, some therapeutic or diagnostic substances of interest for deposition on a patch have to be provided in liquid formulations having such relatively high conductivity (e.g. physiological serum-based formulations).

In other industrial areas, use has been made of the "flow focusing" technology to generate droplets of a first fluid owing to a flow of second fluid surrounding the first fluid exiting a capillary line. Exemplary documents directed to said flow focusing technology are the following:

*Generation of steady liquid microthreads and micro-sized monodisperse sprays in gas streams*, Ganan-Calvo, Physical Review Letters 80, 285-288, 1998;

*Perfectly monodisperse microbubbling by capillary flow focusing*, Ganan-Calvo et al., Physical Review Letters 87, 274501, 2001;

*Enhanced liquid atomization: From flow-focusing to flow-blurring*, Ganan-Calvo, Applied Physics Letters 86, 214101, 2005; and

*Aerodynamically assisted jet processing of viscous single- and multi-phase media*, Arumuganathar et al., Soft Matter, 3:605-612, 2007.

The following publication offers a comparison of the flow focusing and electrospray techniques:

*Revision of capillary cone jet physics: electrospray and flow focusing*, Ganan-Calvo et al., Physical Review E 79, 066305, 2009.

A combination of the principles of the electrospray and flow focusing techniques, sometimes referred to as electro-flow focusing, has been suggested in the following documents:

EP 1479446;

*The combination of electrospray and flow focusing*, Ganan-Calvo et al., J. Fluid Mech., 556, 421-445, 2006;

*Electro-Flow Focusing: The High-Conductivity Low-Viscosity Limit*, Ganan-Calvo, Physical Review Letters 98, 134503, 2007.

There is still presently a need for a method of depositing a substance on a substrate (particularly on a patch, or for making a patch) having an improved yield, especially when the substance is provided in a liquid formulation having a relatively high conductivity, without impairing the accuracy and quality of the deposition. Furthermore, the method of depositing a substance on a substrate must allow instant drying of the substance on the substrate in order to be applicable in an industrial manufacturing environment.

SUMMARY OF THE INVENTION

It is a first object of the invention to provide a method of depositing a substance onto a substrate, comprising:
  providing a substrate at a distance from a conducting spraying nozzle, said spaying nozzle having an outlet;
  providing a liquid composition containing the substance to the spraying nozzle;
  generating electrically charged liquid droplets from the liquid composition between the outlet of the spraying nozzle and the substrate, by providing compressed gas around the liquid composition flowing out of the outlet of the spraying nozzle and by providing an electric field downstream of the outlet of the spraying nozzle; and
- collecting the generated liquid droplets on the substrate.

In some embodiments, the substance is a peptide or protein, preferably an allergen, most preferably selected from peanut, milk, egg, walnut, cashew nut, pecan nut, pistachios, and hazelnut allergens.

In some embodiments, the liquid composition has a conductivity of from 0.1 μS/m to 3 S/m, preferably from 1 mS/m to 20 mS/m.

In some embodiments, the liquid composition is provided to the spraying nozzle at a flow rate of at least 1 m L/h, preferably of at least 1.5 mL/h.

In some embodiments, the compressed gas around the liquid composition is at a pressure of from 0.1 to 2 bar, preferably from 0.3 to 1 bar above atmospheric pressure.

In some embodiments, the spraying nozzle is arranged within a chamber, the compressed gas is fed to the chamber, and the liquid composition and compressed gas flow out of the chamber through an ejection opening in a conducting ejector.

In some embodiments, an electric field having a first magnitude is applied in a first area between the outlet of the spraying nozzle and the ejection opening; and/or an electric field having a second magnitude is applied in a second area between the ejection opening and the substrate; and, preferably, the first magnitude is from 0.1 to 10 MV/m, more preferably from 0.5 to 5 MV/m; and/or, preferably, the second magnitude is from 0.02 to 1 MV/m, more preferably from 0.1 to 0.5 MV/m; and/or, preferably, the first magnitude is larger than the second magnitude.

In some embodiments, the method does not comprise any drying step after collecting the droplets on the substrate.

In some embodiments, the method is for making a patch, preferably a therapeutic patch.

The invention also relates to an installation for depositing a substance on a substrate, comprising:

- a chamber comprising a conducting ejector having an ejection opening;
- a conducting spraying nozzle having an outlet, arranged within said chamber;

a support for placing the substrate at a distance from the spraying nozzle, outside the chamber;

a liquid feed line for feeding a liquid composition comprising the substance to be deposited to the spraying nozzle;

a gas inlet for feeding compressed gas to the chamber;

equipment for generating an electric field within the chamber and/or between the chamber and the substrate.

In some embodiments, the equipment for generating an electric field is configured for generating an electric field both within the chamber and between the chamber and the substrate.

In some embodiments, each of the spraying nozzle and the ejector is connected to a high voltage supply, the installation further comprising contacts for connecting the substrate to the ground.

In some embodiments, the spraying nozzle outlet has an inner diameter $D_i$ from 50 to 500 µm, preferably from 100 to 450 µm, and more preferably from 150 to 400 µm.

In some embodiments, the ejector opening has an inner diameter $D_o$ from 50 to 800 µm, preferably from 100 to 600 µm, and more preferably from 150 to 500 µm.

In some embodiments, the distance H between the outlet of the spraying nozzle and the ejector opening may be from 50 to 550 µm, preferably from 60 to 400 µm, and more preferably from 80 to 250 µm.

The present invention makes it possible to address the need identified above. In particular the invention provides a method of depositing a substance on a substrate (particularly on a patch, or for making a patch) having an improved yield, especially when the substance is provided in a liquid formulation having a relatively high conductivity, without impairing the accuracy and quality of the deposition.

This is achieved by generating droplets of liquid composition and directing them to the substrate by using the electro-flow focusing technique.

BRIEF DESCRIPTION OF THE DRAWINGS

FIG. 1 shows an example of an installation for carrying out the method of the invention, in a schematic manner.

FIG. 2 shows a detail of the installation of FIG. 1, in a schematic manner.

DESCRIPTION OF EMBODIMENTS

The invention will now be described in more detail without limitation in the following description.

Liquid Composition

The substance to be deposited according to the invention may be in particular any pharmaceutical, cosmetic, vaccinal and/or diagnostic substance.

By "substance" is meant one molecule or supramolecular assembly or a mixture of different molecules or supramolecular assemblies.

The substance may be of a biological nature and in particular may be or contain oligopeptides, polypeptides or proteins, in particular antigenic oligopeptides, polypeptides or proteins, hormones, cytokines, immunoglobulins, allergens, growth factors, trophic factors, moisturizing compounds or vitamins, or chemical active ingredients. Preferred substances comprise one or more of immunoreactive oligopeptides, polypeptides or proteins selected from food allergens or human proteins involved in human auto-immune diseases. Most preferred substances are food allergens selected from peanut, milk, egg, walnut, cashew nut, pecan nut, pistachios, and hazelnut allergens.

It may also be or contain one or more drugs or active ingredients including, in a non-limiting manner: nicotine, caffeine, morphine, hydromorphone HCl, fentanyl, apomorphine HCl, scopolamine, chlorpheniramine, imiquimod, diphenhydramide, lidocaine, isotretinoin, ketoprofen, diclofenac, leuprolide, finasteride, etc.

The substance to be deposited is provided in a liquid composition. The liquid composition comprises an aqueous and/or an organic solvent. Mixtures of aqueous and organic solvents are also possible.

The substance is preferably dissolved in the liquid composition.

As organic solvents, alcohols are preferred, especially ethanol.

As aqueous solvents, deionized water or buffered aqueous solutions are preferred. The pH of the composition may be adjusted with e.g. citric acid, sodium hydroxide, Tris and/or Histidine.

In order to accelerate evaporation of the liquid composition on the substrate, and if the substance allows, it may be advantageous to add an organic solvent, especially an alcohol (e.g. ethanol) to an aqueous solvent. In some embodiments, the liquid composition is therefore an aqueous solution comprising from 0.1 to 20% (by total volume), preferably from 0.5 to 10% (by total volume) of an organic solvent, preferably an alcohol, more preferably ethanol. Some types of proteins may not be compatible with such an organic solvent, therefore the use of such a solvent is optional.

The liquid composition may contain the substance of interest in a total concentration of from 0.01 to 20 wt. %, preferably from 0.05 to 10 wt. %, and more preferably from 0.1 to 0.5 wt. %.

In order to stabilize the substance of interest in solution, the liquid composition may contain electrolytes in the form of acids, bases, salts, and/or mixtures thereof. These additives may buffer the solution at a certain pH and their concentration will cause the solution to exhibit a certain ionic strength. According to the nature of these electrolytes and their concentrations, the solution will have a resulting electrical conductivity.

The conductivity of the liquid composition may be from 0.1 μS/m to 3 S/m, preferably from 100 μS/m to 50 mS/m, and more preferably from 1000 μS/m to 20 mS/m. Examples of possible ranges of conductivity are: from 0.1 to 0.3 μS/m; from 0.3 to 1 μS/m; from 1 to 3 μS/m; from 3 to 10 μS/m; from 10 to 30 μS/m; from 30 to 100 μS/m; from 100 to 300 μS/m; from 300 to 1000 μS/m; from 1 to 3 mS/m; from 3 to 10 mS/m; from 10 to 30 mS/m; from 30 to 100 mS/m; from 100 to 300 mS/m; from 300 to 1000 mS/m; from 1 to 3 S/m.

Conductivity may be measured by a conductivity probe.

The liquid composition may comprise one or more additives, such as surfactants, which may be anionic, cationic, zwitterionic and/or nonionic. Preferred surfactants are nonionic surfactants, such as ethoxylated fatty alcohols.

The amount of surfactant in the liquid composition may in particular range from 0.01 to 5 wt. %, preferably from 0.02 to 1 wt. %, and more preferably from 0.05 to 0.5 wt. %.

Substrates and Patches

According to the invention, the substance of interest is deposited onto a substrate.

The substance, once deposited on the substrate (and after an optional drying step), is preferably in substantially dry form, more preferably in the form of microparticles.

The substrate is preferably essentially planar or flat or film-shaped and preferably comprises two faces. In some embodiments, the substrate may comprise a depression forming a chamber, or a reservoir.

The substrate may be rigid or semi-rigid. The substrate may be formed as an individual patch before depositing the substance onto it. It may thus have e.g. a circular, square, rectangular or oval shape.

In other embodiments, the substrate is provided in the form of a plate, or a strip, for example as a roll. The substance is deposited onto the substrate and the substrate is then subsequently cut into shaped pieces to provide patches.

The substrate preferably includes at least one conductive portion. By "conductive" or "conducting" is meant "electrically conductive" or "electrically conducting" in the present application. The conductive portion may be on one face or in the bulk of the substrate. The conductive portion may be a conductive layer on or in the substrate.

The substrate may in particular comprise or consist of different biocompatible materials, such as for example polymer(s), doped polymer(s), polymer(s) coated with conductive material(s), textile and/or biological material(s).

The substrate may in particular comprise at least one conductive face that is positioned facing the spraying nozzle. A preferred substrate thus comprises or consists of an insulating layer, for example an insulating polymer (film, fiber, etc.) layer, covered on at least one face with a conductive layer.

Conductive materials used in the substrate (in particular for providing a conductive layer) may be of inorganic nature (metal for example) or organic nature (for example comprising carbon, graphite or oxide(s)). The metal is preferably gold, silver, platinum, titanium or aluminum. The conductive layer(s) advantageously have a thickness from 2 to 40 nm, preferably from 5 to 20 nm, most preferably of approximately 10 nm.

In the case of a conductive layer made of graphite, graphite deposition on the substrate may be carried out beforehand or on line, just before the deposition of the substance on the substrate. Graphite deposition may be carried out by projecting a neutral or charged aerosol or by impregnation by having a film pass in a graphite solution bath.

The formation of a conductive layer on the substrate before the deposition of the substance may also be achieved by metallization or oxide deposition. The oxide is preferably indium oxide doped with tin (ITO).

A plasma treatment may also be performed in order to promote adhesion to the deposit-substrate interface or to deposit the conductive portion itself.

Thus, in some embodiments, the method of the invention comprises one or more preliminary steps of modifying a substrate e.g. by plasma treatment at low pressure or atmospheric pressure and/or metallization and/or deposition of oxide and/or deposition of graphite.

In some embodiments, the substrate may be a polyethylene-terephthalate (PET) film covered with a conductive gold or titanium layer. It may further include an insulating dual-adhesive crown, for example in polyethylene (PE)/ethylene-vinyl acetate (EVA) foam.

The substrate may in particular be a roll-shape strip which is gradually unwound. The strip advantageously comprises:
 a support film comprising a conductive layer, or in the form of a conductive film (e.g. PET coated with gold);
 a foam film including holes at regular intervals adhered to the conductive film, each portion of conductive layer or film not covered by the foam film forming a deposition area for the substance of interest.

Preferably, the support film is wider than the foam film. Preferably, each deposition area surrounded with foam is in electrical contact with the entirety of the conductive surface of the support film.

After depositing the substance onto the substrate, the substrate or patch formed from the substrate is advantageously packaged so that the substance deposit is protected from the outside environment. Thus, the patch may comprise a peelable film on its surface, covering the substance deposit and optionally also covering the portion of the substrate not comprising deposited substance.

The method of the invention makes it possible to make any type of patch, i.e. any device which may be applied on a skin area of a subject in order to put it into contact with the substance of interest. This includes patches with passive, facilitated or mechanical diffusion, adhesive patches, bandages, plasters, cupules and (trans)dermal patches.

Plasters comprise or consist of an adhesive mass or coating, containing one or more substances of interest and optionally one or more diluents, emollients and adhesives, on a suitable support. The adhesive mass may be such that it softens and then adheres to the skin at the skin temperature. They may be formed as sheets of variable size, to be optionally cut out. They may be attached on an adhesive bandage and covered with perforated material.

Medicinal bandages are intended to be applied on small skin lesions for local action and comprise or consist of an adhesive bandage on which a bandage material covered with a substance is attached.

Adhesive patches may comprise or consist of an adhesive bandage with a plastic disc on which an adhesive mass containing the substance is placed. The adhesive mass may further contain components such as arabic gum or gelatin and water.

Patches with passive, facilitated or mechanical diffusion, typically include a support on which the substance is deposited and optionally a device for facilitating cell permeation (by application of electric pulses, ultrasound, micro-needles, etc.). Preferably, the patch is a dry patch, more preferably of the occlusive type, even more preferably an electrostatic patch, as described in document WO 02/071950.

A patch produced according to the invention may notably be used in pharmaceutical, cosmetic, vaccinal and/or diagnostic applications. Said patch is preferably intended for being applied on the skin, in order e.g. to detect sensitivity of the body to the deposited substance, or to provide a therapeutic amount of the deposited substance to the body.

Patches produced according to the invention may be adapted for animal or human subjects, preferably human subjects.

In order to ensure preservation of the patch in a packaging and to notably avoid alteration of the active ingredients of the deposited substance, and to preserve microbiological quality, the patch may be subjected to additional treatment, such as for example pasteurization or ionization.

In some embodiments, the periphery of the patch is configured in order to create, in contact with the skin, a sealed condensation chamber containing the substance.

General Principle of the Substance Deposition by Electro-Flow Focusing

The method of the invention comprises depositing the substance on the substrate, by spraying the liquid composition on the substrate, using the electro-flow focusing technique.

Figure 2:
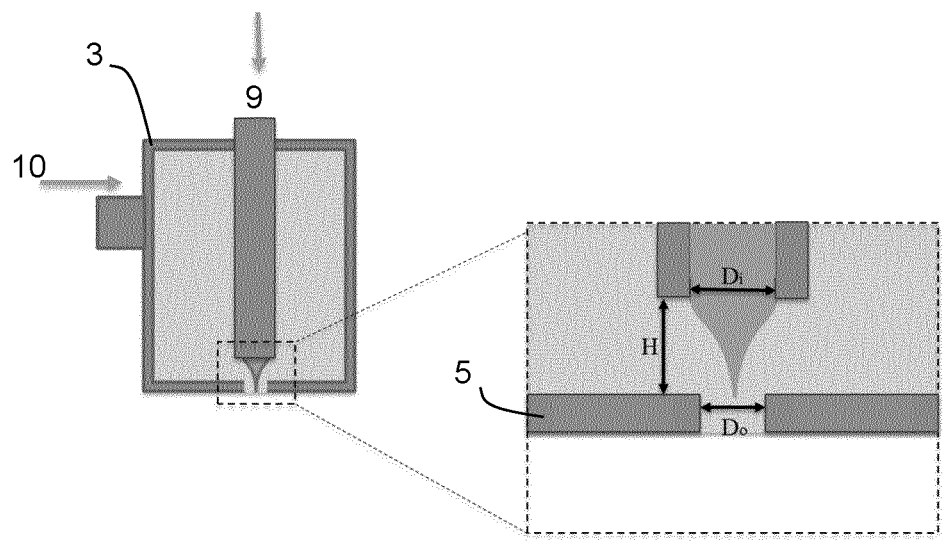

A possible installation for performing the electro-flow focusing deposition is illustrated on FIG. 1 and FIG. 2. The installation comprises a conducting spraying nozzle 1 in a chamber 3. The chamber 3 is provided with compressed gas via a gas inlet 10. The spraying nozzle 1 is connected to or directly formed on a liquid feed line 9.

The spraying nozzle 1 comprises an outlet 2 from which the liquid composition exits the spraying nozzle. The chamber 3 comprises a conducting ejector 5, which is a plate constituting the bottom of the chamber 3. The ejector 5 has an ejection opening 4 facing the outlet 2 of the spraying nozzle 1.

The substrate 6 is placed outside the chamber 3, opposite the ejection opening 4 (and spraying nozzle 1).

The liquid composition flows out of the spraying nozzle outlet 2 and preferably forms a liquid cone 7, which is then broken down into liquid droplets. The formation of droplets is achieved owing to the flow of compressed gas from the chamber 3 through the ejection opening 4 and/or to the action of electrostatic repulsion responsible for droplet formation in electrospray processes. Due to the pressure gradient between the chamber 3 and the environment outside the chamber 3, the compressed gas is forced out of the chamber 3 through the ejection opening 4, as a flowing stream of gas. The gas stream surrounds the liquid cone 7 and forms an aerodynamic sheath around it (as illustrated by the arrows on FIG. 1). The liquid cone 7 forms droplets in a complex process which may occur in the chamber 3 between the nozzle outlet 2 and the top of the ejector, inside the (preferably cylindrical) volume of the ejector opening 4.

In addition, the liquid droplets are charged owing to an electric field as further described below, thus creating electrostatic repulsion.

An aerosol 8 of liquid droplets is thus formed between the ejector opening 4 and the substrate 6.

In some embodiments, the installation may comprise several chambers 3 as described above, so as to simultaneously spray the liquid composition on multiple deposition areas on the same substrate 6 or on different respective substrates 6. These chambers 3 may be for example aligned in one or more rows. The number of chambers 3 may be for example from 2 to 10. More preferably, the chambers 3 and especially their spraying nozzles 1 are mounted on an insulating support.

Chamber

The spraying nozzle outlet 2 may preferably have a circular inner shape. The inner shape of the cavity in the nozzle which leads to the nozzle outlet 2 may e.g. have a cylindrical shape with the same inner diameter along its length, or a conical shape with increasing inner diameter along the length of the cavity.

The spraying nozzle outlet 2 has an inner diameter $D_i$ which may be for example from 50 to 500 µm, preferably from 100 to 450 µm, more preferably from 150 to 400 µm, and most preferably from 200 to 300 µm. In case the spraying nozzle outlet 2 has a non-circular shape, the diameter refers to the maximum dimension of the inner passage in a plane orthogonal to the main direction of liquid flow.

A pumping device may be used for providing the liquid composition from a tank, to the spraying nozzle 1, with a controlled liquid flow rate. In some embodiments, a syringe pump may be used as a pumping device.

The liquid composition may be stored in a refrigerated location at for example −20° C. The liquid composition may be transported to the spraying nozzle 1 at a temperature comprised between 4 and 60° C., preferably at ambient temperature (i.e. typically between 20° C. and 25° C.).

The liquid flow rate may be adjusted in order to control the size of the droplets and to allow acceptable evaporation of the solvent, after or during deposition.

The flow rate to the (or each) spraying nozzle 1 may for example be from 0.01 to 100 mL/h, preferably from 0.1 to 50 mL/h, more preferably from 0.5 to 20 mL/h, even more preferably from 1 to 10 mL/h, and most preferably from 1.5 to 8 mL/h. Possible ranges of flow rate include from 0.5 to 1 mL/h; from 1 to 1.5 mL/h; from 1.5 to 2 mL/h; from 2 to 3 mL/h; from 3 to 5 mL/h; from 5 to 10 m L/h; from 10 to 20 m L/h; and from 20 to 50 mL/h.

A single pumping device can be connected to several spraying nozzles 1, or different individual pumping devices may be connected to different respective spraying nozzles 1.

The ejector opening 4 in the ejector 5 may preferably have a circular shape. It may have an inner diameter $D_o$ which may be from 50 to 800 µm, preferably from 100 to 600 µm, more preferably from 150 to 500, and most preferably from 200 to 500 µm. In case the ejector opening 4 has a non-circular shape, the diameter refers to the maximum dimension of the inner passage in a plane orthogonal to the main direction of liquid flow.

The distance H between the spraying nozzle outlet 2 and the ejector opening 4 may be from 50 to 550 µm, preferably from 60 to 400 µm, more preferably from 70 to 250 µm, and most preferably from 80 to 180 µm. This distance is measured from the bottom of the spraying nozzle 1 to the top of the ejector 5.

The ratio $H/D_o$ may for example be from 0.2 to 1.5, preferably from 0.3 to 1.2, more preferably from 0.75 to 1.

The distance h between the ejector opening 4 and the substrate may be from 10 to 120 mm, preferably from 20 to 100 mm, more preferably from 30 to 80 mm. This distance is measured from the bottom of the ejector 5 to the top of the substrate 6.

Compressed Gas

The compressed gas used in the method of the invention may be for example air, nitrogen, nitrous oxide, carbon dioxide, an inert gas such as argon, or a mixture thereof. Preferred gas for safety reasons is either air or nitrogen.

The source of gas may be for example a pressurized gas bottle, connected to the gas inlet 10. Alternatively, use may be made of a gas compressor to provide the compressed gas to the gas inlet 10.

The flow of compressed gas to the chamber 3 and through the ejector 5 can be controlled by pressure or by flow rate.

Pressure within the chamber 3 may thus range for example from 0.05 to 5 bar above atmospheric pressure, preferably from 0.1 to 2 bar above atmospheric pressure, more preferably from 0.3 to 1 bar above atmospheric pressure.

Gas flow rate to the chamber 3 (or through the ejector opening 4) may range for example from 0.02 to 10 Ln/min, preferably from 0.05 to 5 Ln/min, and more preferably from 0.1 to 1 Ln/min.

Control of the injection of compressed gas may be achieved by using for example a regulator connected to a mass flow control system capable of control using either a pressure or flowrate setpoint.

Electric Field

The liquid composition is subjected to an electric field which is generated in the chamber 3 and/or between the chamber 3 and the substrate 6. Preferably, the electric field is generated both in the chamber 3 and between the chamber 3 and the substrate 6.

The electric field is preferably constant over time.

The magnitude of the electric field to which the liquid composition is subjected in a first area within the chamber 3 (i.e. between the spraying nozzle 1 and the ejector 3) is preferably larger than the magnitude of the electric field to which the liquid composition is subjected in a second area outside of the chamber 3 (i.e. between the ejector 3 and the substrate 6).

The magnitude of the electric field to which the liquid composition is subjected in the first area is preferably substantially uniform.

The magnitude of the electric field to which the liquid composition is subjected in the second area is preferably substantially uniform.

The magnitude of the electric field to which the liquid composition is subjected in the first area may be for example from 0.1 to 10 MV/m, preferably from 0.5 to 5 MV/m, more preferably from 1 to 2.5 MV/m.

The magnitude of the electric field to which the liquid composition is subjected in the second area may be for example from 0.02 to 1 MV/m, preferably from 0.1 to 0.5 MV/m, more preferably from 0.1 to 0.2 MV/m.

The electric field in the first area may contribute to the generation of liquid droplets and also ensures that any droplets formed in this area are electrically charged.

The electric field in the second area is useful to direct and focus the droplets onto the substrate or onto a desired deposition zone on the substrate.

In order to generate the electric field in the first area, the spraying nozzle 1 is made of a conductive material, preferably a metal, such as stainless steel (or any biocompatible conductive material) and the ejector 5 is made of a conductive material, preferably a metal (while the other walls of the chamber 3 are preferably isolated).

The spraying nozzle 1 may be polarized by connecting it to a first high voltage supply, and the ejector 5 may be also polarized by connecting it to a second high voltage supply.

The first high voltage supply and the second high voltage supply may be different or may be the same high voltage supply provided with a voltage divider setup. The high voltage supply may be a DC generator.

The spraying nozzle 1 and the ejector 5 are electrically insulated from each other. They therefore form respective electrodes.

The voltage difference between the spraying nozzle 1 and the ejector 5 generates the electric field in the first area. Depending on the distance h, this voltage difference may be for example from 50 V to 1000 V, preferably from 100 V to 800 V, more preferably from 100 V to 600 V.

The substrate 6 preferably comprises a conductive portion, as described above. It may be grounded by connecting said conductive portion to one or more metallic conductors linked to the ground.

Alternatively, the substrate 6 can be polarized by connecting it (via one or more metallic conductors) to another high voltage supply.

Alternatively, use may be made of a counter-electrode adjacent to, e.g. in contact with the substrate 6, which may be connected to the ground or polarized by connecting it to a high voltage supply. For instance, the substrate 6 may be positioned on a support which is itself grounded or polarized by connecting it to a high voltage supply.

The voltage difference between the ejector 5 and the substrate 6 or the counter-electrode adjacent to the substrate 6 generates the electric field in the second area.

Said voltage difference may be from 1 to 20 kV, preferably from 2 to 15 kV, more preferably from 3 to 10 kV and even more preferably from 4 to 7 kV.

In some embodiments, a shielding electrode may be positioned on top of the substrate 6, or between the ejector 5 and the substrate 6. Said shielding electrode may be for example ring-shaped or may be a plate with one or more openings in order to allow the aerosol 8 to reach the substrate 6. Said shielding electrode may either be polarized by connecting it to a high voltage supply or be connected to the ground.

The shielding electrode may comprise a conductive portion and an insulating portion. It may be positioned perpendicularly to the spraying direction of the composition, preferably at a distance comprised between 1 and 50 mm from the ejector 5. The shielding electrode makes it possible to better control the diameter of the substance deposit on the substrate, by generating a controlled electrostatic repulsion between the shielding electrode and the charged droplets. The diameter of the deposit therefore depends on the potential applied on the shielding electrode.

The high voltage supply used in the present invention may for example be adapted to provide a DC current from −5 to +5 mA and to apply a DC voltage from −30 to +30 kV.

Substance Deposition

The aerosol generated according to the invention preferably comprises droplets having a median number distribution diameter (Dn50) from 1 to 50 μm, preferably from 2 to 20 μm, more preferably from 5 to 15 μm, most preferably from 8 to 12 μm (measured by phase Doppler anemometry PDA).

The substance of interest is deposited on at least one deposition area on the substrate 6. Said deposition area is preferably disk-shaped. It may have a diameter from 1 to 100 mm, preferably from 2 to 50 mm, more preferably from 5 to 45 mm, most preferably from 10 to 40 mm. In case the deposition area has a non-disk shape, the diameter refers to the maximum dimension of the deposition area.

An insulating collar (such as an adhesive insulating collar) may be provided on the substrate 6 in order to delimit the deposition area, by focusing the electric field lines to the deposition area of the substrate 6.

Preferably, the solvent present in the droplets of the liquid composition substantially evaporates when the method of the invention is carried out. Said evaporation may substantially or entirely take place during the deposition step itself, in which case no drying step is necessary.

In order to assist evaporation during the deposition step, the substrate 6 may be heated. For example, the substrate 6 may be brought to a temperature of from 20 to 80° C., preferably from 25 to 70° C., more preferably from 30 to 60° C. and most preferably from 35 to 55° C. Heating may be performed for example by placing the substrate 6 on a heated support, such as a metallic piece (e.g. stainless steel or aluminum) electrically heated by a resistor. Temperature may be regulated, for example by a resistance temperature detector.

Alternatively, a drying step may be provided after the deposition step. The drying step may include one or more of heating by convection, heating by irradiation (for example with ultraviolet or infrared radiation), freeze-drying or circulation of dry gas.

EXAMPLES

The following examples illustrate the invention without limiting it.

Example 1: Deposit of 300 µg of Milk Protein on a Patch

A patch is manufactured using the device shown in FIGS. 1 and 2.

The nozzle 1 has an inner diameter $D_i$ of 300 µm and the ejector 5 has an ejection opening 4 diameter $D_o$ of 400 µm. The distance H between the nozzle opening 2 and the ejector opening 4 is 80 µm.

The patch consists of: a support 6 in polyethyleneterephthalate (PET) film covered with a thin conductive titanium layer (10 nm), and a dual-adhesive insulating crown in PET/EVA foam.

Liquid exits the nozzle 1 while a mixture of gas and liquid passes through the ejector opening 4. Both the nozzle outlet 2 and the ejection opening 4 have circular inner shapes.

The chamber 3 comprising the volume between the nozzle and the ejector is pressurized by either $N_2O$ or $N_2$ or a 50/50 mixture of $N_2O/N_2$ gas at a pressure of 0.7 bar above atmospheric pressure, and this gas flows through the ejection opening at a flow rate of 0.7 Ln/min.

The substrate for deposit formation also plays the role of a counter-electrode and is placed at a distance h of 45 mm from the ejector opening and is connected to ground.

The nozzle 1 and ejector 5 are connected to voltage supplies, the nozzle 1 is polarized to 6.2 kV (electric field E1=2.5 MV/m) and the ejector 5 is polarized to 6 kV (electric field E2=0.13 MV/m); the nozzle-ejector voltage difference is thus 200 V.

A liquid formulation having high electrical conductivity is supplied to the nozzle at a flow rate of 3 mL/h. It is an aqueous formulation containing milk proteins at a concentration of 2.5 g/L, Brij O2 as a nonionic surfactant at a concentration of 0.5 g/L; it has a pH of 7.2, an electrical conductivity of 27000 µS/m and a surface tension of 38 mN/m. Using a substrate heater set at 50° C., and under these conditions of spraying for a period of 150 s, a circular dry deposit containing milk proteins is formed on the substrate which has a 24 mm diameter.

Example 2: Deposit of 300 µg of Milk Protein on a Patch Using Another Set of Geometrical Parameters In this example, the nozzle 1 has an inner diameter $D_i$ of 200 µm and the ejection opening 4 diameter $D_o$ is 200 µm. The distance H between the nozzle and the ejector is 200 µm.

The chamber 3 is pressurized by $N_2O$ or $N_2$ or a mixture of $N_2O/N_2$ gas at a pressure of 0.7 bar above the atmospheric pressure, and this gas flows through the ejector orifice at a flow rate of 0.3 Ln/min.

The counter-electrode (substrate) is placed at a distance h of 70 mm from the ejection opening 4 and is connected to ground.

The nozzle and ejector are connected to voltage supplies, the nozzle is polarized to 6.4 kV (Electric field E1=2 MV/m) and the ejector is polarized to 6 kV (E2=0.13 MV/m); the nozzle-ejector voltage difference is thus 400 V. The liquid formulation is the same as used in example 1. The liquid flow rate is 3 mL/h and the spray duration is 150 seconds.

These conditions lead to a circular dry deposit containing 300 µg of milk proteins of 24 mm diameter formed on the substrate heated at 50° C.

Using the same composition in an electrospray depositing technology according to WO 2009/095591, the maximum flow rate for which stable operation of the spray is possible is 1 m L/h, meaning the spraying process takes more time to create a patch with the same dose of active ingredient, thus demonstrating the limitation of electrospray depositing technology for use with high electrical conductivity liquids.

Example 3: Deposit of 250 µg of Peanut Protein on a Patch

In this example, the nozzle 1 has an inner diameter $D_i$ of 200 µm and the ejection opening 4 diameter $D_o$ is 200 µm. The distance H between the nozzle and the ejector is 200 µm.

The chamber 3 is pressurized by $N_2O$ or $N_2$ or a mixture of $N_2O/N_2$ gas at a pressure of 0.7 bar above the atmospheric pressure, and this gas flows through the ejector orifice at a flow rate of 0.35 Ln/min.

The counter-electrode (substrate) is placed at a distance h of 70 mm from the ejection opening 4 and is connected to ground.

The nozzle and ejector are connected to voltage supplies, the nozzle is polarized to 6.4 kV (Electric field E1=2 MV/m) and the ejector is polarized to 6 kV (E2=0.13 MV/m); the nozzle-ejector voltage difference is thus 400 V.

A liquid formulation is supplied to the nozzle at a flow rate of 3 mL/h. The liquid formulation contains peanut proteins at a concentration of 4 g/L, Brij O2 as a nonionic surfactant at a concentration of 1 g/L, and ethanol at 10 wt. %. The liquid formulation has a pH of 7.6, an electrical conductivity of 7000 µS/m and a surface tension of 38 mN/m. Using a substrate heater set at 50° C., and under these conditions of spraying for a period of 90 seconds, a circular dry deposit containing peanut proteins is formed on the substrate which has a 24 mm diameter.

By way of comparison, when using electrospray depositing technology according to WO 2009/095591, the maximum liquid flow rate possible is 1.6 m L/h.

Example 4: Deposit of Physiologic Saline on a Patch

An aqueous formulation containing physiologic saline (0.9% NaCl) with D-Mannitol (1,2,3,4,5,6-Hexanehexol) at a concentration of 1 g/L is used in order to simulate a white deposit; the electrical conductivity is 1.2 S/m. The nozzle 1 has an inner diameter $D_i$ of 200 µm and the ejection opening 4 diameter $D_o$ is 200 µm. The distance H between the nozzle and the ejector is 200 µm.

The chamber 3 is pressurized by $N_2O$ or $N_2$ or a mixture of $N_2O/N_2$ gas at a pressure of 0.7 bar above the atmospheric pressure, and this gas flows through the ejector orifice at a flow rate of 0.35 Ln/min.

The counter-electrode (substrate) is placed at a distance h of 70 mm from the ejection opening 4 and is connected to ground.

The nozzle and ejector are connected to voltage supplies, the nozzle is polarized to 6.4 kV (Electric field E1=2 MV/m) and the ejector is polarized to 6 kV (E2=0.13 MV/m); the nozzle-ejector voltage difference is thus 400 V. In that case, the liquid was about 100 times more conductive than milk formulation; the same result was a dry deposit of 24 mm diameter, with substrate heating at 50° C.

Using the same composition in an electrospray depositing technology according to WO 2009/095591, it is impossible to generate a patch due to the presence of electrical discharges which prevent stable operation of the process.

The following tables summarize the parameters used in the various examples, for the device and the liquid composition:

| Nozzle inner diameter (μm) | Ejector inner diameter (μm) | H (μm) | h (mm) | E1 (MV/m) | E2 (mV/m) | Surrounding gas |
|---|---|---|---|---|---|---|
| 300 | 400 | 80 | 45 | 2.5 | 0.1 | $N_2$ and/or $N_2O$ |
| 200 | 200 | 200 | 70 | 2 | 0.1 | $N_2$ and/or $N_2O$ |

| Liquid composition | pH | Electrical Conductivity | Surface tension | Nonionic surfactant |
|---|---|---|---|---|
| Aqueous formulation with milk proteins | 7.0-7.2 | 26000-30000 μS/m | 38-41 mN/m | 0.5 mg/mL |
| Aqueous formulation with peanut proteins | 7.5-7.7 | 5000-7000 μS/m | 38-40 mN/m | 1 mg/mL |

| Liquid composition | Electrical Conductivity | Deposit diameter |
|---|---|---|
| Ethanol 70 and 96 wt. % | 0.1 μS/m | 24 mm |
| Physiologic saline (0.9% NaCl) | 1.2 S/m | 24 mm |

The invention claimed is:

1. A method of depositing one or more allergens onto a substrate, comprising:
    providing a substrate at a distance from a conducting spraying nozzle, said spraying nozzle having an outlet;
    providing a liquid composition containing the one or more allergens to the spraying nozzle at a flow rate of from 3 to 50 mL/h;
    generating electrically charged liquid droplets from the liquid composition between the outlet of the spraying nozzle and the substrate, by providing compressed gas around the liquid composition flowing out of the outlet of the spraying nozzle and by providing an electric field downstream of the outlet of the spraying nozzle, wherein the compressed gas is selected from the group consisting of nitrogen, nitrous oxide, carbon dioxide, inert gas, argon, and mixtures thereof, and further wherein the compressed gas around the liquid composition is at a pressure of from 0.1 to 2 bar above atmospheric pressure; and
    collecting the generated liquid droplets on the substrate;
    wherein the spraying nozzle is arranged within a chamber, the compressed gas is fed to the chamber, and the liquid composition and compressed gas flow out of the chamber through an ejection opening in a conducting ejector, and
    wherein the one or more allergens are selected from the group consisting of peanut, milk, egg, walnut, cashew nut, pecan nut, pistachios, and hazelnut allergens.

2. The method of claim 1, wherein the liquid composition has a conductivity of from 0.1 μS/m to 3 S/m.

3. The method of claim 1, wherein an electric field having a first magnitude is applied in a first area between the outlet of the spraying nozzle and the ejection opening; and/or an electric field having a second magnitude is applied in a second area between the ejection opening and the substrate; and wherein the first magnitude is from 0.1 to 10 MV/m; and/or the second magnitude is from 0.02 to 1 MV/m; and/or the first magnitude is larger than the second magnitude.

4. The method of claim 1, which does not comprise any drying step after collecting the droplets on the substrate.

5. The method of claim 1, for making one selected from the group consisting of a patch and a therapeutic patch.

6. The method of claim 1, wherein the compressed gas around the liquid composition is at a pressure of from 0.3 to 1 bar above atmospheric pressure.

7. The method of claim 3, wherein the first magnitude is from 0.5 to 5 MV/m; and/or the second magnitude is from 0.1 to 0.5 MV/m.

8. The method of claim 1, wherein the liquid composition is provided to the spraying nozzle at a flow rate selected from the group consisting of 3 to 5 mL/h, 3 to 10 mL/h, 3 to 20 mL/h, 5 to 10 mL/h, 5 to 20 mL/h, 5 to 50 mL/h, 10 to 20 mL/h, 10 to 50 mL/h, and 20 to 50 mL/h.

9. The method of claim 1, wherein the compressed gas is selected from the group consisting of nitrogen, nitrous oxide, and mixtures thereof.

10. The method of claim 1, wherein the one or more allergens are selected from the group consisting of peanut, milk, and egg allergens.

11. The method of claim 1, wherein the one or more allergens is peanut allergen.

12. The method of claim 1, wherein the one or more allergens is milk allergen.

13. The method of claim 1, wherein the one or more allergens is egg allergen.

* * * * *